United States Patent [19]
Forsythe

[11] Patent Number: 5,409,307
[45] Date of Patent: Apr. 25, 1995

[54] COMBINED COMPUTER AND VEHICLE SIMULATOR COCKPIT DESK AND METHOD THEREOF

[76] Inventor: Lester W. Forsythe, 3967 Riverlook Pkwy., Marietta, Ga. 30067

[21] Appl. No.: 197,671

[22] Filed: Feb. 17, 1994

Related U.S. Application Data

[63] Continuation of Ser. No. 934,186, Aug. 21, 1992, abandoned.

[51] Int. Cl.⁶ ..................... A47B 13/00; A47B 17/00
[52] U.S. Cl. .................................. 312/194; 297/119; 312/235.2; 312/240
[58] Field of Search ............... 297/118, 119, 383; 312/194, 195, 204, 240, 235.2, 239, 257.1

[56] References Cited

U.S. PATENT DOCUMENTS

| | | | |
|---|---|---|---|
| 10,740 | 4/1854 | Hedges | 297/119 X |
| 1,272,245 | 7/1918 | Fitzgerald | 312/194 X |
| 1,485,549 | 3/1924 | Bieneman | 312/194 X |
| 2,080,869 | 5/1937 | McNeely, Sr. | 312/194 X |
| 2,341,914 | 2/1944 | Fleischman | 312/194 X |
| 2,461,123 | 2/1949 | Miller | 297/383 X |
| 2,466,350 | 4/1949 | Anderson | 297/383 X |
| 2,649,137 | 8/1953 | Roberts | 312/194 X |
| 3,087,767 | 4/1963 | Schell | 312/240 |
| 3,088,785 | 5/1963 | Schuette | 312/195 |
| 3,149,891 | 9/1964 | Wilmer | 312/194 |
| 3,159,423 | 12/1964 | Gilbert | 312/235.2 X |
| 3,362,767 | 1/1968 | Chancellor, Jr. | 312/196 |
| 3,405,988 | 10/1968 | Eversman | 312/254 |
| 3,408,127 | 10/1968 | Vincens | 312/194 |
| 3,549,227 | 12/1970 | Stark | 312/194 |
| 3,922,973 | 12/1975 | Sturgeon | 108/26 |
| 3,951,486 | 4/1976 | Tracy | 312/235 |
| 4,033,652 | 7/1977 | O'Brien | 312/245 |
| 4,431,080 | 2/1984 | Everhart | 182/15 |
| 4,901,651 | 2/1990 | Herron | 109/54 |

*Primary Examiner*—Joseph M. Gorski
*Attorney, Agent, or Firm*—Hopkins & Thomas

[57] ABSTRACT

A desk (10) is easily converted into a vehicle simulator cockpit. The desk (10) has a fixed desktop portion (12) configured to support a computer display screen (16). A removable desktop portion (11) is hingedly and slidably engaged with a back panel (24) of the desk (10) so that the removable desktop portion (11) is movable from a first position alongside the fixed desktop portion (12) to a second position substantially parallel to the back panel (24). A simulator seat (33) which faces the fixed desktop portion (12) and the computer display screen (16), is disposed below the removable desktop portion (11) while in the first position and is exposed while the removable desktop portion (11) resides in the second position. A joystick, keyboard, and throttle platform supports are situated below the removable desktop portion (11) and are movable to positions for supporting a joystick, keyboard, and throttle, respectively, in front of the simulator seat (33). Finally, rudder pedals may be disposed in an open space beneath the fixed desktop portion 12.

33 Claims, 4 Drawing Sheets

COMBINED COMPUTER AND VEHICLE SIMULATOR COCKPIT DESK AND METHOD THEREOF

This is a continuation of application Ser. No. 07/934,186 filed on Aug. 21, 1992 and now abandoned.

BACKGROUND OF THE INVENTION

I. Field of the Invention

The present invention generally relates to furniture, and more particularly, to furniture which can easily be converted from a typical office desk which can support, for example, a personal computer, to a vehicle simulator cockpit for use with vehicle simulation software programs.

II. Description of Related Art

For many years, vehicle simulators have been used by engineers, scientists, and researchers as a tool for realistically reproducing the environment perceived by operators of moving vehicles, ranging from spacecraft to automobiles. In many instances, these simulators are used as training devices for very complex vehicles having high operational costs and risks. For example, simulators have been developed for new and high performance aircraft.

Historically, flight simulators have been complex and costly, and consisted of cockpits and controls duplicating that of the real moving vehicle to be simulated. In the case of complex aircraft, numerous instruments and gauges were provided and were typically driven by analog computers. Because of the complexity and high cost, use of simulators was generally limited to research and experimentation by government and corporate entities.

However, with the advent of highly sophisticated personal computers and inexpensive software, another use for simulators has recently emerged: vehicle simulations for home entertainment. Home computer enthusiasts are now experiencing the thrill and visual sensations of flying a state-of-the-art fighter aircraft or driving a Formula One racing car without leaving their homes or risking life and limb. In fact, vehicle simulator programs have been among the most successful entertainment software for personal computers in recent years.

These simulator programs are becoming more and more realistic and sophisticated as newer generations of personal computers became faster, more powerful, and affordable. As these simulators grow in complexity and realism, operator interface devices are being developed to further enhance the realism and feel of the simulated vehicle. For a flight simulator, these interface devices now include, for example, a joystick (also, control yoke), a throttle, and rudder pedals, all very similar to the control devices found in actual aircraft cockpits.

In the past, furniture has also been designed specifically for supporting a personal computer. Generally, computer furniture primarily provides the user with a desirable platform for conveniently resting a personal computer and its associated peripheral devices and user interface devices. In some cases, the platform is large enough to provide the user with a small work area for writing and/or for performing other office-type tasks. Unfortunately, these articles of furniture are unsuitable for the simulator enthusiast who wishes to take full advantage of the capabilities of the available simulation hardware and software.

When utilizing a personal computer as a vehicle simulator, the user typically connects interface devices, for example, a joystick or throttle, to more accurately and realistically control the simulated vehicle. These interface devices must be placed on or near the desk or table supporting the computer along with the computers associated keyboard, video display screen, and perhaps a mouse. Also, if rudder pedals are used, for example, in the case of a flight simulator, they must be placed on the floor beneath the desk or table.

Needless to say, the foregoing arrangement creates a very crowded, disorganized, and unrealistic environment for the simulator user, and in many cases, the desk or table may not be of a sufficient size to accommodate all of these peripheral and user interface devices. Consequently, the computer or some of the associated devices must be temporarily relocated to an appropriate area during vehicle simulation. This relocation process is undesirably tedious, time-consuming, and the potential for damaging the computer and the peripheral/interface devices is very real.

Furthermore, when the computer is being utilized for purposes other than vehicle simulations, the user interface devices utilized for vehicle simulations can render an ordinary work surface such as a desk or table useless, unless these user interface devices are removed from the desk and stored. Moreover, if the user interface devices are not disconnected from the computer, they can only be stored within generally a short distance determined by the length of the connecting cable.

SUMMARY OF THE INVENTION

Accordingly, an object of the present invention is to overcome the problems and deficiencies of the prior art as described above.

Another object of the present invention is to provide an article of furniture which can function as both a typical office desk and a vehicle simulator cockpit for use with vehicle simulation software programs or the like.

Another object of the present invention is to provide an article of furniture which can function as both a computer desk for supporting a computer and a vehicle simulator cockpit for use with vehicle simulation software programs operated on the computer with associated user interface devices, for example, a joystick and/or a throttle and/or rudder pedals.

Another object of the present invention is to provide a combined computer and vehicle simulator cockpit desk which is inexpensive, durable in structure, and "user friendly" in operation.

Briefly stated, the present invention is a desk which serves dual roles. The desk can serve as a typical office desk, which can support a computer, and, after an easily implemented modification, can serve as a vehicle simulator cockpit for use with vehicle simulation software programs. In structure, the desk comprises a fixed desktop portion configured to support a computer display screen. A removable desktop portion is situated alongside of the fixed desktop portion. A simulator seat facing the fixed desktop portion is disposed below the removable desktop portion and is exposed upon removing the removable desktop portion. Accordingly, when a user wishes to convert the desk to a vehicle simulator cockpit, the removable desktop portion is removed, and consequently, the user can sit in the exposed simulator seat facing the computer display screen situated on the fixed desktop portion.

In a specific preferred embodiment of the present invention, the removable desktop portion is slidably engaged with a back panel of the desk via slider hinge assemblies. As a result, the removable desktop portion is movable from a first position alongside of the fixed desktop portion to a second position substantially parallel to the back panel.

The present invention may also be conceptualized as a method for providing realistic vehicle simulations while using a computer. Broadly stated, the method comprises the following steps: configuring a desk to have a removable desktop portion adjacent a fixed desktop portion capable of supporting a computer display screen; and disposing a simulator seat beneath the removable desktop portion facing the fixed desktop portion.

The present invention has numerous additional features and advantages not previously mentioned. For instance, a desirable feature of the present invention is that it provides an article of furniture with an easily accessible built-in shelf to conveniently house a computer.

Another desirable feature of the present invention is that it provides an article of furniture which has a built-in simulator seat and internal platform supports in realistic locations for user interface devices, such as a joystick, control yoke, throttle, rudder pedals, keyboard, and mouse, while the article is being utilized as a vehicle simulator cockpit.

Another desirable feature of the present invention is that it provides an article of furniture with internal storage for the user interface devices while the article is being utilized as a desk without disconnecting the user interface devices from the computer.

Another desirable feature of the present invention is that it provides an article of furniture which easily reconfigures from a desk to a vehicle simulator cockpit, and vice versa, with a minimum of effort.

Another desirable feature of the present invention is that it provides an article of furniture which comprises a horizontal work surface of a size comparable to that of a typical office desk for a sitting user while in the desk configuration.

Other objects, features, and advantages of the present invention will become apparent from the detailed description and the accompanying drawings.

BRIEF DESCRIPTION OF THE DRAWINGS

The present invention, as defined in the claims, can be better understood with reference to the following drawings. The drawings are not necessarily to scale, emphasis instead being placed upon clearly illustrating principles of the present invention.

DETAILED DESCRIPTION OF THE PREFERRED EMBODIMENT

Figure 1:
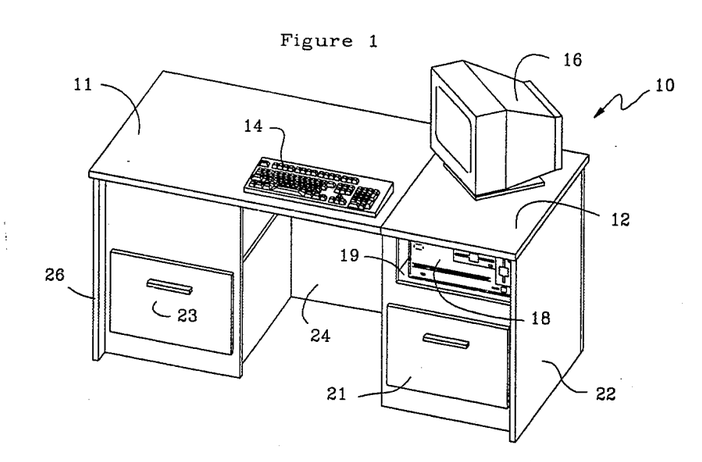
FIG. 1 is a perspective view of the present invention in a computer desk configuration showing the typical placement of the components of a computer.

With reference to the figures wherein like reference numerals designate corresponding parts throughout the several views, a combined computer and vehicle simulator cockpit desk is illustrated in FIG. 1, generally denoted by a reference numeral 10. The novel desk 10 has a removable desktop portion 11 situated alongside of a fixed desktop portion 12. The desk 10 supports a computer system having a keyboard 14, a computer display screen 16, and a computer 18, which is preferably a personal computer, microcomputer, or minicomputer. A shelf 19 may be provided in the desk 10 to support the computer 18 preferably under the fixed desktop portion 12. The desk 10 may further be provided with drawers 21, 23, for example, serving as storage elements.

Figure 2:
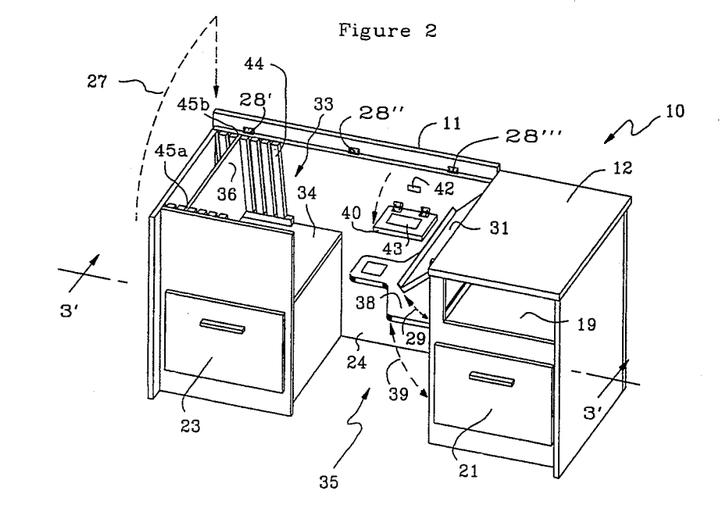
FIG. 2 is a perspective view of the present invention in a vehicle simulator cockpit configuration wherein the left portion of the desktop is capable of being stowed in a substantially vertical plane directly behind the desk by means of slider hinge assemblies.

As illustrated in FIG. 2, the desk 10 can be converted into a vehicle simulator cockpit by moving the removable desktop portion 11 from a first position alongside of the fixed desktop portion 12 to a second position substantially parallel to the back panel 24 of the desk 10. The removable desktop portion 11 is moved as indicated by phantom lines 27 via slider hinge assemblies 28', 28'', 28''' connected between the removable desktop portion 11 and the back panel 24 of the desk 10. It should be noted that the slider hinge arrangement is preferred, but necessary for practicing the present invention. In fact, the removable desktop portion 11 need not be attached at all to the desk 10. It merely needs to be removable from the top of the desk 10.

As further shown in FIG. 2, removal of the removable desktop portion 11 exposes a simulator seat 33 having a buttocks support 34 and a back support 36. The back support 36 is selectively adjustable. A plurality of seat back adjustment rails 44 are disposed at both sides of the back support 36 to thereby provide pairs of opposing slots. The back support 36 is removably disposed in a pair of opposing slots via slidable mating engagement with opposing sides 45a, 45b of the back support 36. Essentially, the back support 36 is slid into and from the tops of a pair of opposing slots.

A keyboard platform support 31 is hingedly engaged with the desk 10 via a cross support 56 so that the keyboard platform support 31 is movable, as indicated by a reference arrow 29, from a vertical position along a vertical side of a desk leg entry 35 to a second position outwardly protruding from the vertical side. In the preferred embodiment, the keyboard platform support 31 resides approximately 35° from the vertical side. However, many other angles are possible and further, the structure may be designed so that the angle is user selectable. While in the first position, the keyboard platform support 31 is out of the way of the user and does not encumber the legs of the user sitting in front of the desk 10 with legs extended into the desk leg entry 35. While in the second position, the keyboard platform support 31 preferably resides directly in front of the user sitting in the simulator seat 33 so as to provide user friendly access thereto to a keyboard residing thereon.

A joystick platform support 38 is also hingedly engaged with a vertical side of the desk leg entry 35 via a cross support 58, as shown in FIG. 2. In the preferred embodiment, the joystick platform support 38 is hingedly engaged with the same vertical side as the keyboard platform support 31. However, obviously, this need not be the case. As indicated by phantom lines 39 in FIG. 2, the joystick platform support 38 is movable from a first position substantially parallel to the vertical side of the desk leg entry 35 to a second position substantially perpendicular to the vertical side. While in the first position, the joystick platform support 38 is out of the way of the user and does not encumber the legs of the user sitting in front of the desk 10 with legs extended into the desk leg entry 35. While in the second position, the joystick platform support 38 preferably resides directly in front of the user sitting in the simulator seat 33 so as to provide user friendly access to a joystick (not shown in FIG. 2) residing thereon.

A throttle platform support 41 is hingedly disposed on the back panel 24 of the desk 10 for supporting a throttle in front of the user. The throttle platform support 41 is movable from a first position substantially parallel to the back panel 24 of the desk 10 to a second position substantially perpendicular to the back panel 24. While in the, first position, the throttle platform support 41 is engaged with the back panel 24 of the desk 10 via a conventional hook and loop engaging means 42, 43, such as Velcro ™. Moreover, in the first position, the throttle platform support 41 is out of the way of the user and does not encumber the legs of the user sitting in front of the desk 10 with legs extended into the desk leg entry 35. While in the second position, the throttle platform support 41 preferably resides directly in front and to the left side of the user sitting in the simulator seat 33 so as to provide user friendly access to a throttle (not shown in FIG. 2) residing thereon.

Figure 3:
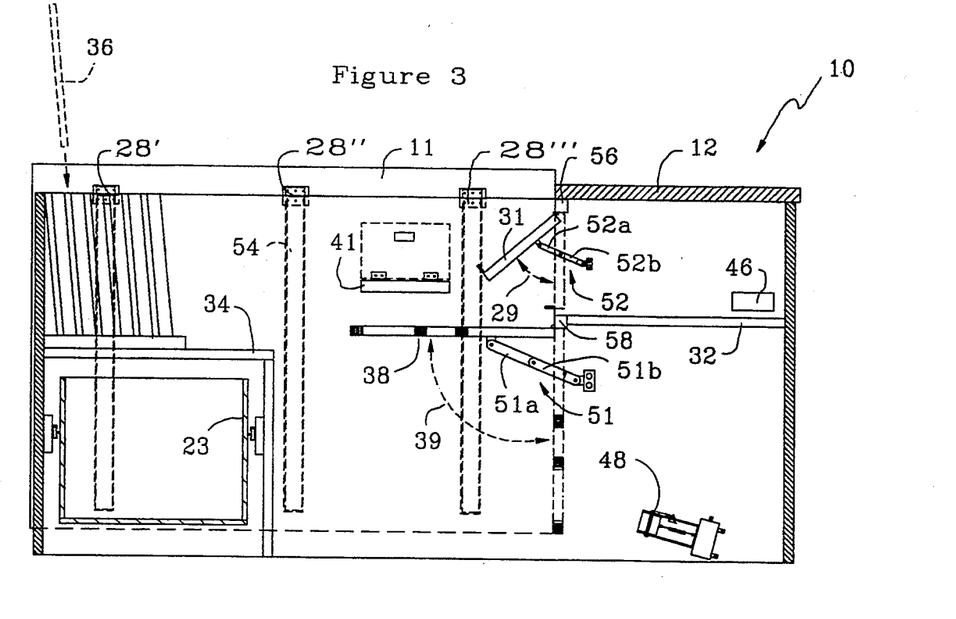
FIG. 3 is a cutaway front elevational view of the present invention in the vehicle simulator cockpit configuration taken along line 3'—3' of FIG. 2.

FIG. 3 illustrates a cutaway front elevational view of the desk 10 taken along line 3'—3' of FIG. 2. As shown in FIG. 3, the joystick platform support 38 is supported by a collapsible support brace 51, having two elongate members 51a, 51b pivotally connected therebetween for effectuating the collapsible nature of the support brace 51. Moreover, the keyboard platform support 31 is supported by a collapsible support brace 52, having two elongate members 52a, 52b pivotally connected therebetween for effectuating the collapsible nature of the support brace 52. It is envisioned that the collapsible support brace 52 may be configured so that the user may select any appropriate angle of inclination for the keyboard platform support 31. The foregoing structures are well known in the art. The desk 10 may further be provided with rudder pedals 48 which are situated in an open space near the feet of the user. If rudder pedals 48 are implemented, then the drawer 21 is preferably eliminated. In this case, a nonfunctional drawer front portion may be affixed to the front of the desk 10 for aesthetic reasons. FIG. 3 also discloses a cut-out 46 for computer cables connected to the computer 18.

Figure 4:
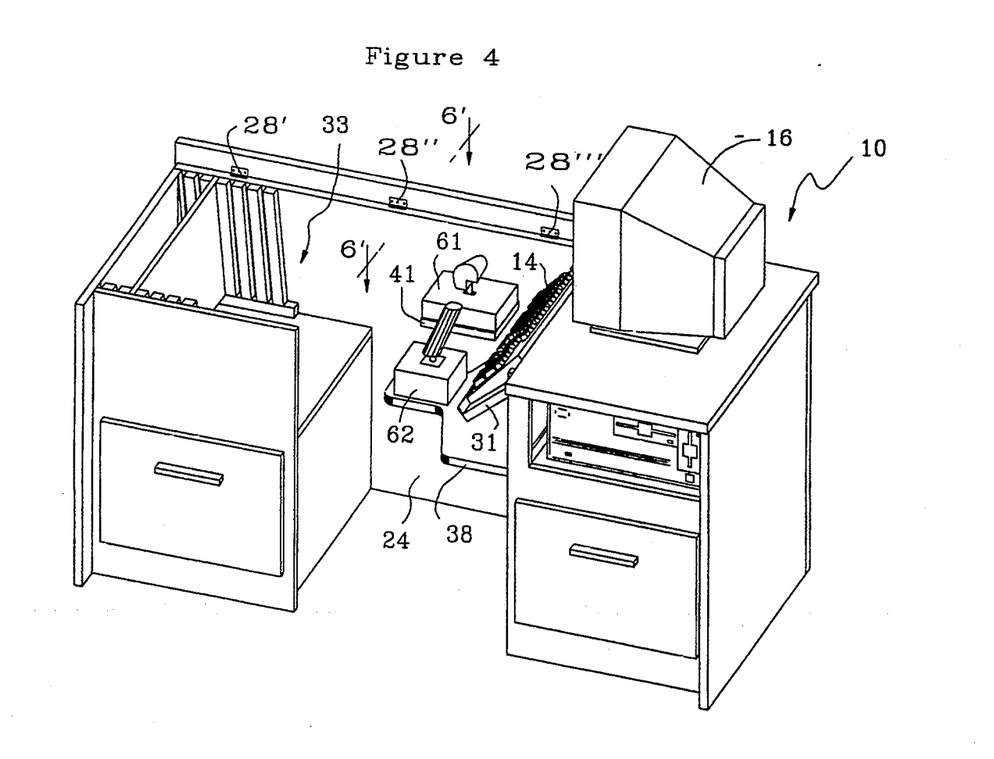
FIG. 4 is a perspective view of the present invention in the vehicle simulator cockpit configuration of FIG. 2 showing the placement of all the components of the computer and user interface devices.
Figure 5:
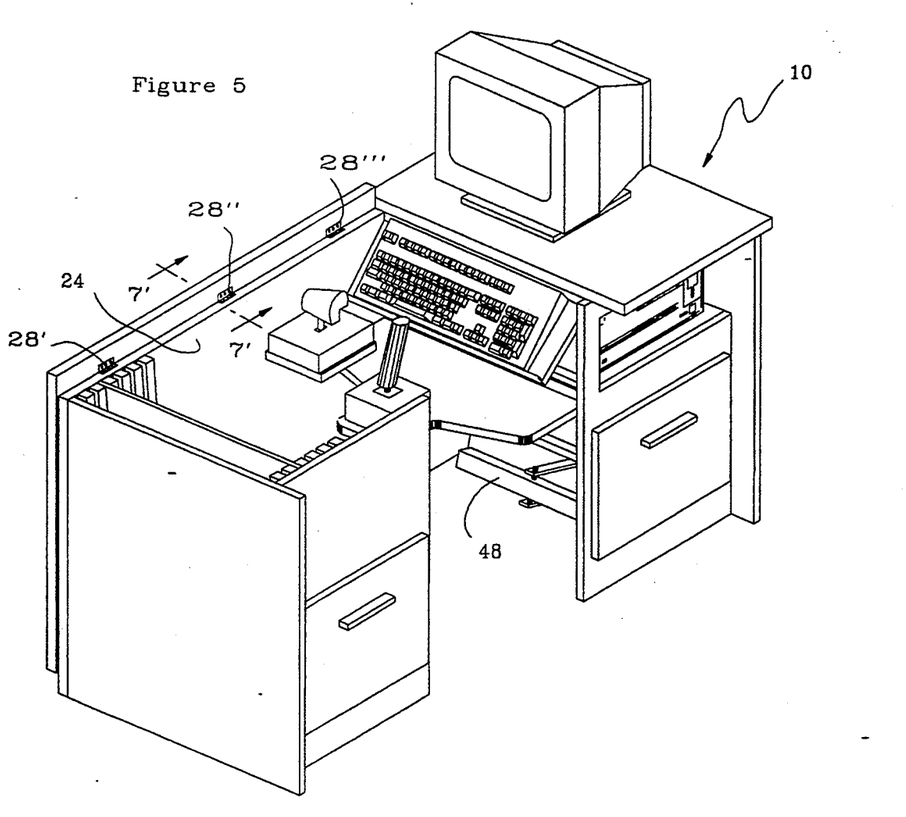
FIG. 5 is a perspective view of the present invention in the vehicle simulator cockpit configuration of FIG. 2 showing the placement of rudder pedals.

FIGS. 4 and 5 illustrate perspective views of the desk 10 in the vehicle simulator cockpit configuration showing the placement of all the components of the computer and the user interface devices. The computer display screen 16 is adjusted so that it directly faces the user sitting on the simulator seat 33. The computer keyboard 14 is placed on the keyboard platform support 31 situated in an outward position. A throttle 61 is positioned on the throttle platform support 41 situated in an outward position. A joystick 62 is positioned on the joystick platform support 38 situated in an outward position. Finally, FIG. 5 shows the rudder pedals 48 situated below the computer shelf 32 for easy access by the user.

Note that when the desk 10 is in the computer desk configuration, the throttle 61 and the joystick 62 may be placed in storage on the buttocks support 34 of the seat 33. The buttocks support 34 may also be used to store other related components while the desk is in the computer desk configuration.

Figure 6:
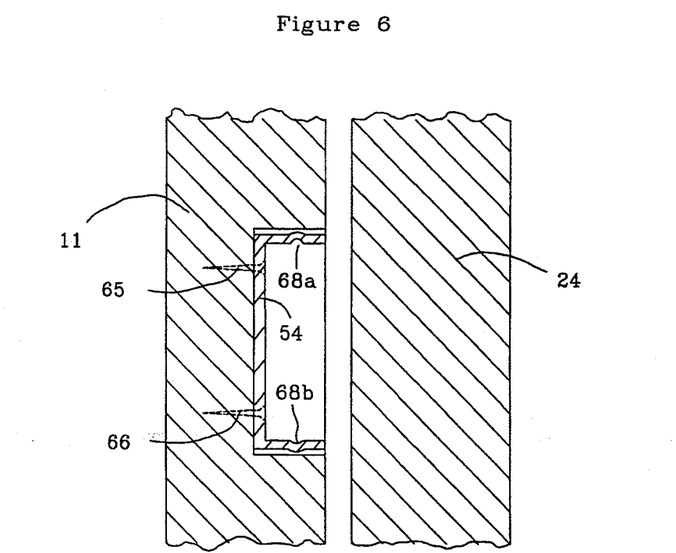
FIG. 6 is a cutaway partial top view of the desktop slider hinge track taken along line 5'—5' of FIG. 4.
Figure 7:
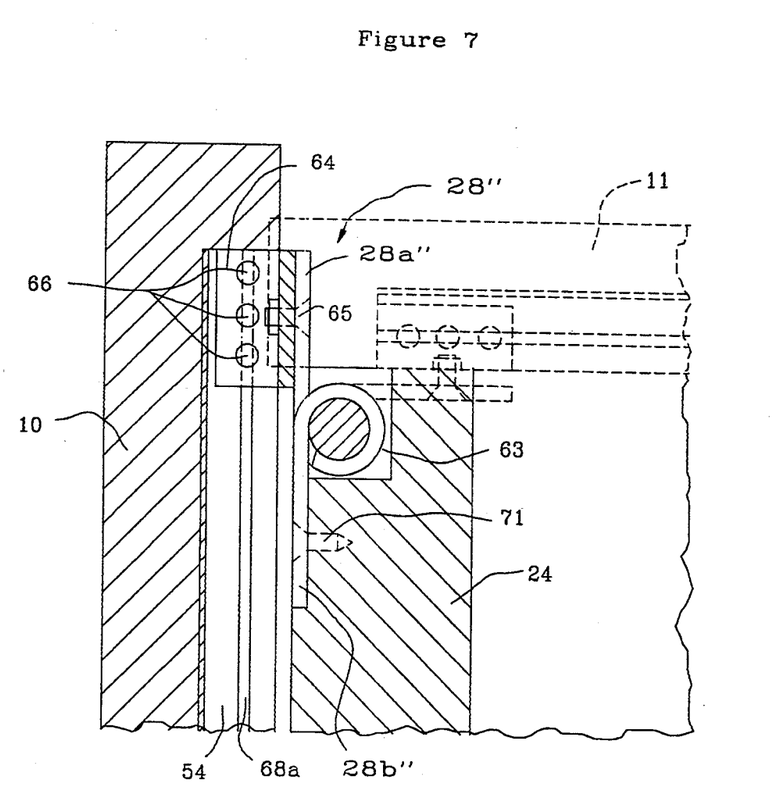
FIG. 7 is a cutaway partial side view of the desktop slider hinge assembly taken along line 7'—7' of FIG. 5.

To more clearly understand operation of the slider hinge assemblies 28', 28", 28''' connecting the removable desktop portion 11 and the back panel 24, FIGS. 6 and 7 show orthogonal cutaway views of the slider hinge assembly 28", as an example. It should be understood that all of the slider hinge assemblies 28', 28", 28''' are preferably identical in structure and operation. Hence, the discussion hereafter relative to the slider hinge assembly 28" is equally applicable to the slider hinge assemblies 28', 28'''.

In regard to the slider hinge assembly 28", a cutaway top view taken along line 6'—6' of FIG. 4, is shown in FIG. 6. As illustrated in FIG. 6, a slider hinge track 54 is mounted in the removable desktop portion 11 via wood screws 65, 66 so that the slider hinge track 54 is flush with the bottom surface 67 of the removable desktop portion 11. In essence, the slider hinge track provides a guide for a hinge slider (not shown in FIG. 6) of the slider hinge assembly 28".

FIG. 7 shows a cutaway side view taken along line 7'—7' of FIG. 5. As illustrated in FIG. 7, the slider hinge assembly 28" has first and second ends 28a", 28b" which are pivotally engaged via a central pivoting means 63. The first end 28a" has a hinge slider 64 mounted thereto via a screw(s) 65 or some other fastening mechanism. The hinge slider 64 moves along the slider hinge track 54 situated within the removable desktop portion 11 as the removable desktop portion 11 is moved from the first position adjacent the fixed desktop portion 12, which is shown by phantom lines, to the second position parallel to the back panel. 24. Movement of the hinge slider 64 along the track 54 is accomplished via rollers 66, which can also take the form of fixed pins, if desired, and which is movable along opposing roller tracks 68a, 68b within the slider hinge track 54. Finally, the second end 28b" of the slider hinge assembly 28" is mounted to the back panel 24 of the desk 10 by way of a screw(s) 71 in order to further effectuate the pivotal movement of the slider hinge assembly 28".

It will be obvious to those skilled in the art that many variations may be made to the preferred embodiment of the present invention described above without departing from the novel teachings of the present invention. For example, the removable desktop portion 11 need not be attached to the back panel 24 of the desk 10, or any other desk panel, in order to practice the novel principles of the present invention. As another example, the platform supports 31, 38, 41 could be hinged at sides of the desk leg entry 35 which are different than those described and shown herein. All such variations are intended to be incorporated herein and within the scope of the following claims.

Wherefore, I claim the following:
1. A desk for providing a vehicle simulator cockpit, comprising:
   a desktop;

a fixed desktop portion of said desktop configured to support a computer display screen;

a removable desktop portion situated alongside of said fixed desktop portion;

a simulator seat having a back support and a buttocks support, said buttocks support and said fixed desktop portion being separated by a leg entry of said desk, said simulator seat and said leg entry being disposed below said removable desktop portion when said removable desktop portion resides alongside said fixed desktop portion and being exposed when said removable desktop portion is removed; and a joystick platform support situated below said removable desktop portion, said joystick platform support being hinged to a means defining said leg entry and provided with a collapsible support brace therebetween so that said joystick platform support is movable between a vertical position and a horizontal position.

2. The desk of claim 1, wherein said removable desktop portion is slidably engaged with a back panel of said desk so that said removable desktop portion is movable from a first position along side of said fixed desktop portion to a second position substantially parallel to said back panel.

3. The desk of claim 1, wherein said simulator seat further comprises pairs of opposing slots and wherein said back support has opposite sides, said back support being removably disposed in a pair of said opposing slots via mating engagement with said opposing sides.

4. A desk for providing a vehicle simulator cockpit, comprising;

a desktop;

a fixed desktop portion of said desktop configured to support a computer display screen;

a removable desktop portion situated alongside of said fixed desktop portion;

a simulator seat having a back support and a buttocks support, said buttocks support and said fixed desktop portion being separated by a leg entry of said desk, said simulator seat and said leg entry being disposed below said removable desktop portion when said removable desktop portion resides alongside said fixed desktop portion and being exposed when said removable desktop portion is removed; and a keyboard platform support situated below said removable desktop portion, said keyboard platform support being hinged to a means defining said leg entry and provided with a collapsible support brace therebetween so that said keyboard platform support is movable between a vertical position and to a horizontal position.

5. The desk of claim 1, further comprising a keyboard platform support situated below said removable desktop portion.

6. The desk of claim 5, further comprising a throttle platform support situated below said removable desktop portion.

7. The desk of claim 4, wherein said removable desktop portion is slidably engaged to the back panel of said desk so that said removable desktop portion is movable from a first position along side of said fixed desktop portion to a second position substantially parallel to said back panel.

8. The desk of claim 4, further comprising a joystick platform support situated below said hinged desktop portion.

9. The desk of claim 8, further comprising a throttle platform support situated below said removable desktop portion.

10. The desk of claim 4, wherein said simulator seat further comprises pairs of opposing slots and wherein said back support has opposing sides, said back support being removably disposed in a pair of said opposing slots via mating engagement with said opposing sides.

11. A desk for providing a vehicle simulator cockpit, comprising:

a fixed desktop portion configured to support a computer display screen;

a removable desktop portion adjacent to said fixed desktop portion and residing over a leg entry of said desk, said removable desktop portion and said fixed desktop position defining collectively a desktop having a periphery, said removable desktop portion slidably engaged with a back panel of said desk so that said removable desktop portion is movable from a first position alongside said fixed desktop portion to a second position substantially parallel to said back panel;

a simulator seat means for facing a person toward said fixed desktop portion, said simulator seat means disposed below said removable desktop portion while in said first position and being exposed while said removable desktop portion resides in said second position, said simulator seat means having a back support and a buttocks support defined by panels of said desk and situated within said periphery, said buttocks support and said fixed desktop portion being separated by said leg entry of the desk; and a joystick platform support situated below said hinged desktop portion, said joystick platform support being hinged to a vertical panel of said desk leg entry and provided with a collapsible support brace therebetween so that said joystick platform support is movable from a first position substantially parallel to said vertical panel to a second position substantially perpendicular to said vertical panel.

12. The desk of claim 11, further comprising a keyboard platform situated below said removable desktop portion.

13. The desk of claim 12, further comprising a throttle platform support situated below said removable desktop portion.

14. The desk of claim 11, wherein said simulator seat further comprises pairs of opposing slots and wherein said back support has opposing sides, said back support being removably disposed in a pair of said opposing slots via mating engagement with said opposing sides.

15. A desk for providing a vehicle simulator cockpit, comprising:

a fixed desktop portion configured to support a computer display screen;

a removable desktop portion adjacent to said fixed desktop portion and residing over a leg entry of the desk, said removable desktop portion and said fixed desktop position defining collectively a desktop having a periphery, said removable desktop portion slidably engaged with a back panel of said desk so that said removable desktop portion is movable from a first position alongside said fixed desktop portion to a second position substantially parallel to said back panel;

a simulator seat means for facing a person toward said fixed desktop portion, said simulator seat means disposed below said removable desktop portion while in said first position and being exposed while said removable desktop portion resides in said second position said simulator seat means having a back support and a buttocks support defined by panels of said desk and situated within said periphery, said buttocks support and said fixed desktop portion being separated by said leg entry of the desk; and a keyboard platform support situated below said removable desktop portion, said keyboard platform support being hinged to a vertical panel of said desk leg entry and provided with a collapsible support brace therebetween so that said keyboard platform support is movable from a first position substantially parallel to said vertical panel to a second position outwardly protruding from said vertical panel.

16. The desk of claim 15, further comprises a joystick platform situated below said hinge desktop portion.

17. The desk of claim 16, further comprising a throttle platform situated below said removable desktop portion.

18. The desk of claim 15, wherein said simulator seat further comprises pairs of opposing slots and wherein said back support has opposing sides, said back support being removably disposed in a pair of said opposing slots via mating engagement with said opposing sides.

19. A desk for providing a vehicle simulator cockpit, comprising:
a desktop;
a fixed desktop portion of said desktop configured to support a computer display screen;
a removable desktop portion of said desktop situated alongside of said fixed desktop portion;
a simulator seat having a back support and a buttocks support, said buttocks support and said fixed desktop portion being separated by a leg entry of the desk, said simulator seat and said leg entry being disposed below said removable desktop portion when said removable desktop portion resides alongside said fixed desktop portion and being exposed when said removable desktop portion is removed;
a joystick platform support situated below said removable desktop portion, said joystick platform support being hinged to a vertical panel adjacent to said leg entry and provided with a collapsible support brace therebetween so that said joystick platform support is movable between a vertical position and a horizontal position; and
whereby a person may convert said desk to and use said desk as said vehicle simulator cockpit by removing said removable desktop portion, sitting on said seat within said desk, and viewing said computer display screen on said fixed desktop portion.

20. The desk of claim 19, further comprising a keyboard platform support situated below said removable desktop portion.

21. The desk of claim 20, further comprising a throttle platform support situated below said removable desktop portion.

22. The desk of claim 19, wherein said simulator seat further comprises pairs of opposing slots and wherein said back support has opposing sides, said back support being removably disposed in a pair of said opposing slots via mating engagement with said opposing sides.

23. A desk for providing a vehicle simulator cockpit, comprising:
a desktop;
a fixed desktop portion of said desktop configured to support a computer display screen;
a removable desktop portion of said desktop situated alongside of said fixed desktop portion;
a simulator seat having a back support and a buttocks support, said buttocks support and said fixed desktop portion being separated by a leg entry of the desk, said simulator seat and said leg entry being disposed below said removable desktop portion when said removable desktop portion resides alongside said fixed desktop portion and being exposed when said removable desktop portion is removed;
a keyboard platform support situated below said removable desktop portion, said keyboard platform support being hinged to a vertical panel adjacent to said desk leg entry and provided with a collapsible support brace therebetween so that said keyboard platform support is movable from a first position substantially parallel to said vertical side to a second position outwardly protruding from said vertical side; and
whereby a person may convert said desk to and use said desk as said vehicle simulator cockpit by removing said removable desktop portion, sitting on said seat within said desk, and viewing said computer display screen on said fixed desktop portion.

24. The desk of claim 23, further comprising a joystick platform support situated below said hinged desktop portion.

25. The desk of claim 24, further comprising a throttle platform support situated below said removable desktop portion.

26. The desk of claim 23, wherein said simulator seat further comprises pairs of opposing slots and wherein said back support has opposing sides, said back support being removably disposed in a pair of said opposing slots via mating engagement with said opposing sides.

27. A desk for providing a vehicle simulator cockpit, comprising:
a fixed desktop portion configured to support a computer display screen;
a removable desktop portion adjacent to said fixed desktop portion and residing over a leg entry of the desk, said removable desktop portion and said fixed desktop portion defining collectively a desktop having a periphery, said removable desktop portion slidably engaged with a back panel of said desk so that said removable desktop portion is movable from a first position alongside said fixed desktop portion to a second position substantially parallel to said back panel;
a simulator seat means for facing a person toward said fixed desktop portion, said simulator seat means being disposed below said removable desktop portion while in said first position and being exposed while said removable desktop portion resides in said second position, said simulator seats means having a back support and a buttocks support defined by panels of said desk and situated within said periphery, said buttocks support and said fixed desktop portion being separated by said leg entry of the desk; and a joystick platform support situated below said hinged desktop portion, wherein said joystick platform support is hinged to a means defining said leg entry and provided with a collapsible support brace therebetween so that said joystick platform support is movable between a vertical position and a horizontal position.

28. The desk of claim 27, further comprising a keyboard platform support situated below said removable desktop portion.

29. The desk of claim 28, further comprising a throttle platform support situated below said removable desktop portion.

30. The desk of claim 27, wherein said simulator seat further comprises pairs of opposing slots and wherein said back support has opposing sides, said back support being removably disposed in a pair of said opposing slots via mating engagement with said opposing sides.

31. A desk for providing a vehicle simulator cockpit, comprising:

a fixed desktop portion configured to support a computer display screen;

a removable desktop portion adjacent to said fixed desktop portion and residing over a leg entry of the desk, said removable desktop portion and said fixed desktop portion defining collectively a desktop having a periphery, said removable desktop portion slidably engaged with a back panel of said desk so that said removable desktop portion is movable from a first position alongside said fixed desktop portion to a second position substantially parallel to said back panel;

a simulator seat means for facing a person toward said fixed desktop portion, said simulator seat means being disposed below said removable desktop portion while in said first position and being exposed while said removable desktop portion resides in said second position, said simulator seats means having a back support and a buttocks support defined by panels of said desk and situated within said periphery, said buttocks support and said fixed desktop portion being separated by said leg entry of the desk; and a keyboard platform support situated below said removable desktop portion, wherein said keyboard platform support is hinged to a means defining said desk leg entry and provided with a collapsible support brace therebetween so that said keyboard platform support is movable from a first position substantially parallel to said means defining said desk leg entry to a second position outwardly protruding from said means defining said desk leg entry.

32. The desk of claim 31, further comprising a joystick platform support situated below said hinged desktop portion.

33. The desk of claim 32, further comprising a throttle platform support situated below said removable desktop portion.

* * * * *